ically Patent [19]

German et al.

[11] 3,788,598
[45] Jan. 29, 1974

[54] HOSE COUPLER
[75] Inventors: Dale F. German, Bryan; Allen L. Clark, Pioneer, both of Ohio
[73] Assignee: The Aro Corporation, Bryan, Ohio
[22] Filed: Dec. 27, 1971
[21] Appl. No.: 212,055

Related U.S. Application Data
[63] Continuation-in-part of Ser. No. 26,957.

[52] U.S. Cl. ............................................ 251/149.6
[51] Int. Cl. ............................................ F16l 37/28
[58] Field of Search ........ 251/149.6, 150, 342, 339; 137/525.1, 525.3

[56] References Cited
UNITED STATES PATENTS
2,731,028  1/1956  McCord ........................ 251/339 X
2,328,948  9/1943  Bourke ........................ 251/339 X
2,744,770  5/1956  Davidson et al. ............. 251/149.6 X
2,263,293  11/1941  Ewald ............................. 251/149.6
2,099,335  11/1937  Hansen ........................... 251/149.6
2,755,060  7/1956  Twyman ............................ 251/342

Primary Examiner—Samuel Scott
Assistant Examiner—Ira S. Lazarus
Attorney, Agent, or Firm—Molinare, Allegretti, Newitt & Witcoff

[57] ABSTRACT

An improved coupler which includes a coupler body and a connection nipple. Upon insertion of the nipple into the coupler body, an elastically deformable valve member is opened by the action of the connection nipple to permit passage of fluid through the coupler. Locking elements prevent disengagement of the connection nipple from the body.

12 Claims, 6 Drawing Figures

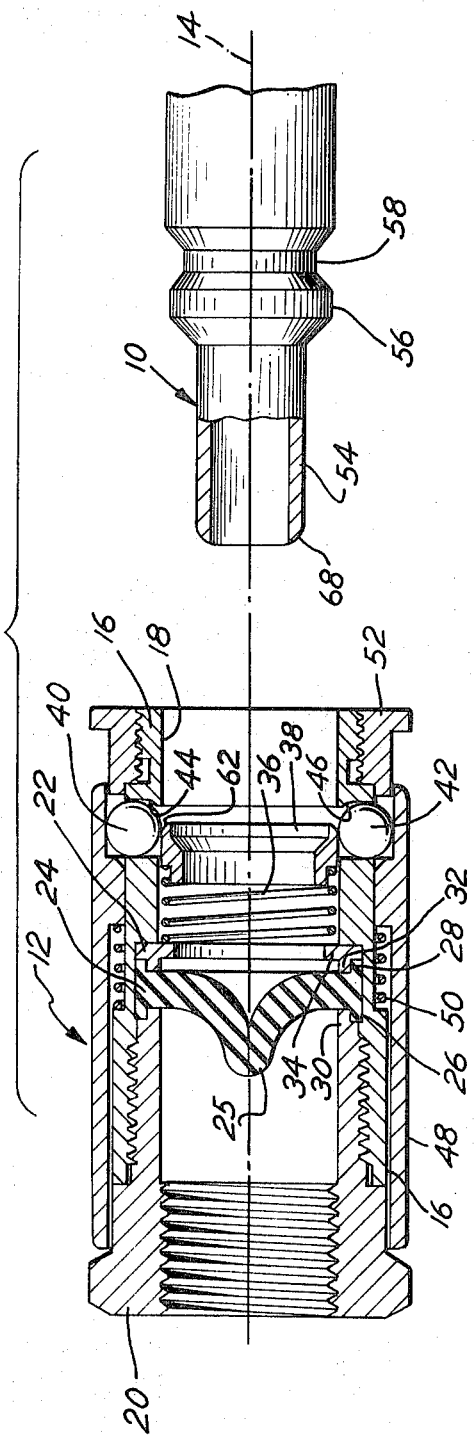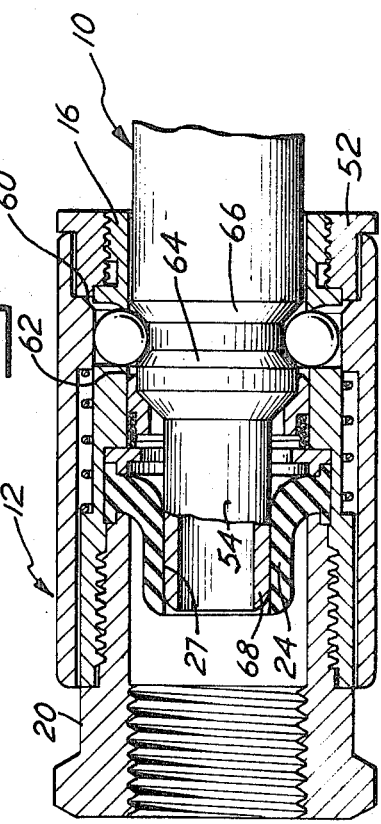
Fig. 1
Fig. 2
INVENTORS
DALE F. GERMAN
& ALLEN L. CLARK
BY
ATTORNEYS

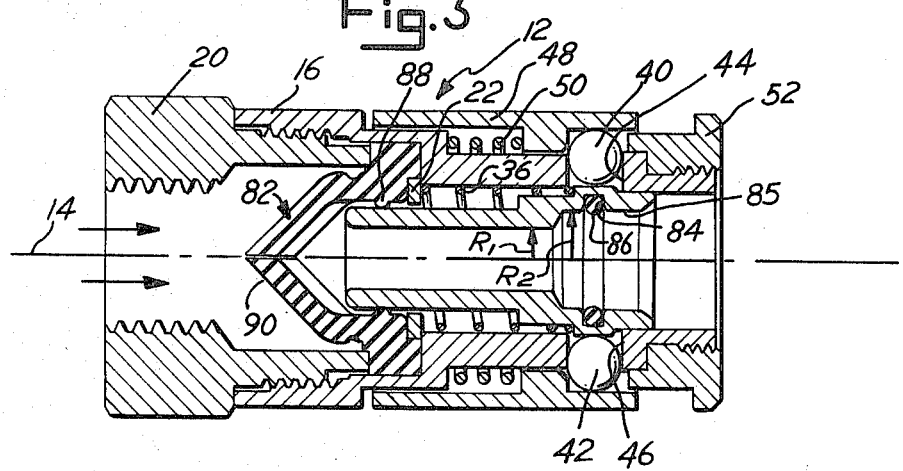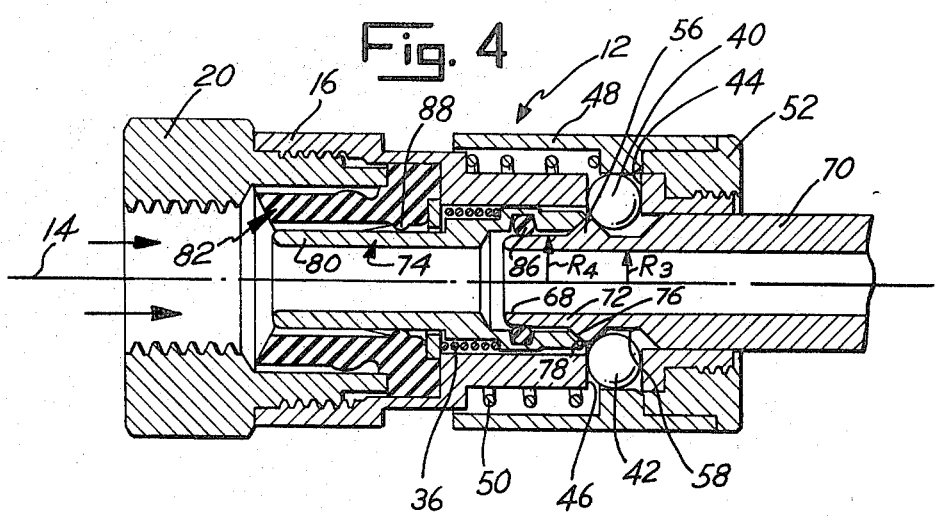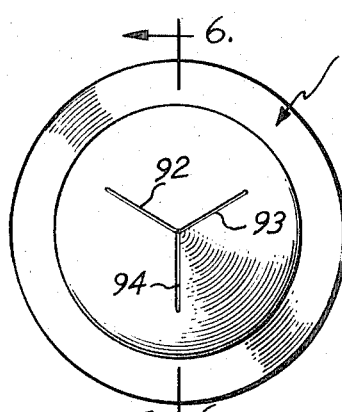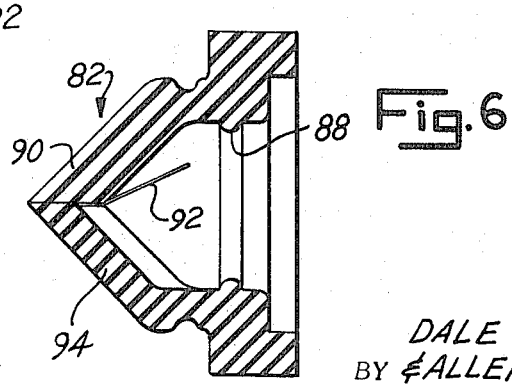

dish
HOSE COUPLER

CROSS REFERENCE TO RELATED APPLICATION

This is a continuation in part application of Ser. No. 26,957 filed Apr. 9, 1970 now abandoned, for a Hose Coupler.

BACKGROUND OF THE INVENTION

This invention relates to an improved hose coupler.

There are numerous types and varieties of couplers for fluid flow lines. Such couplers are used, for example, in combination with pneumatic tools and other fluid driven devices. Because a coupler usually restricts the path of fluid flow, a pressure drop will exist where a coupler is utilized. To overcome any adverse effects resulting from this pressure drop, it is possible to increase the size of the coupler. However, increased coupler size is not only cumbersome, but adds to the expense of a system. Thus, it is most desirable to maximize the size of a fluid flow passage through a coupler while at the same time it is desirable to minimize the size of the coupler.

SUMMARY OF THE INVENTION

In a principal aspect, the present invention of an improved coupler comprises a valve and coupler body connectable with a connection nipple or connector to provide a relatively large diamater fluid flow passage at least equal in size to the inside diameter of the fluid flow passage through the connection nipple. This is accomplished by providing an elastically deformable valve member within the valve and coupler body. The elastically deformable valve member is normally closed due to its elastic nature and also due to the fluid pressure in the coupler. Insertion of the nipple into the coupler body forces the deformable valve member open. The valve member is self-sealing.

It is thus an object of the present invention to provide an improved fluid hose coupler.

Still another object of the present invention is to provide a coupler with a flexible sealing member which may be opened by direct impingement of a connector or tube section in the coupler.

Another object of the present invention is to provide a coupler which is compatible with standard connectors.

It is a further object of the present invention to provide a fluid coupler having a fluid flow passage therethrough which may easily be at least equal in size to the fluid flow passage of the connection nipple of the coupler.

Still another object of the present invention is to provide an improved coupler having an uncomplicated and economical construction.

One further object of the present invention is to provide an improved coupler which is not cumbersome.

These and other objects, advantages and features of the present invention will be set forth in greater detail in the description which follows.

BRIEF DESCRIPTION OF THE DRAWING

In the detailed description which follows, reference will be made to the drawing comprised of the following figures:

FIG. 1 is a cross-sectional view of a first embodiment of the improved coupler of the present invention with the connection nipple separated from the valve and coupler body;

FIG. 2 is a cross-sectional view of the coupler shown in FIG. 1 with the connection nipple inserted into the valve and coupler body;

FIG. 3 is a cross-sectional view of a second embodiment of the improved coupler of the present invention;

FIG. 4 is a cross-sectional view of the coupler shown in FIG. 3 with a standard connector inserted into the coupler body;

FIG. 5 is a front view of the elastic valve member of the coupler as viewed from the upstream or pressurized side of the coupler unit; and FIG. 6 is a cross-sectional view of the valve taken along the line 6—6 in FIG. 5.

DESCRIPTION OF THE PREFERRED EMBODIMENTS

A first embodiment of the coupler of the invention is illustrated in FIGS. 1 and 2 and is comprised of two separate sections, a connection nipple or connector 10 and a valve and coupler body unit 12. The connector 10 and body unit 12 may be interlocked as illustrated in FIG. 2 to provide for connection of fluid hoses such as pneumatic hoses connected respectively to the connector 10 and body unit 12.

A second embodiment of the invention is illustrated in FIGS. 3 and 4. FIGS. 5 and 6 illustrate a typical elastic valve member for either of the embodiments.

In FIGS. 1 through 4, cross-sectional views are shown since the components of the coupler units are cylindrical and thus have a uniform cross-section through a center line axis 14, except where otherwise specified.

The valve and coupler body unit 12 is comprised of a body 16 having an outlet bore 18 at one end and an inlet fitting 20 threaded onto the opposite end. The inlet fitting 20 cooperates with a locking flange ring 22 to maintain an elastically deformable valve member 24 in position in the interior passage defined by the inlet fitting 20 and the body 16.

The valve member 24 is made from an elastically deformable material, such as rubber or the like, and is formed in the shape of a disc with a central opening therethrough. The valve member is also shaped so that a projection or protrusion 25 extends centrally along the axis 14 toward the inlet side of the valve and coupler body unit 12. The valve member 24 is therefore substantially symmetrical about the center line axis 14. In cross section as shown in FIG. 1, the projection 25 of the valve member 24 is termed a "duck bill" cross section. The point or beak of the "duck bill" is directed toward the inlet side of the coupler unit 12. A single center line opening or passage 27 is defined in the projection 25.

The outer circumference of the valve member 24 is locked in position against the body 16 by means of the inlet fitting 20 and locking flange ring 22. Thus, the valve member 24 includes first and second outwardly extending, circumferential valve member flange sections 26 and 28 which cooperate respectively with a flange 30 of inlet fitting 20 and a flange 32 of locking flange ring 22 to maintain the valve member 24 fixed within the body 16.

The locking flange ring 22 also includes an inwardly extending circular flange section 34 which cooperates with a spring 36 to bias a retainer ring 38 outwardly toward the outlet side of the valve and coupler body unit 12. In the configuration illustrated by FIG. 1 when the connector 10 is disengaged from the valve and coupler body unit 12, the retainer ring 38 fits against locking elements, 40 and 42.

The locking elements 40 and 42 are typically ball bearings positioned in openings 44 and 46 in body 16. The ball bearings or locking elements 40 and 42 may float freely within the openings 44 and 46. When the locking element retainer ring 38 engages the locking elements 42 and 44, an outer locking sleeve 48 which is normally biased toward the outlet side of the body unit 12 by a spring 50 is maintained in a retracted position by the locking elements 42 and 44. An outlet sleeve fitting 52 is threaded to the body 16 to assist in maintaining the alignment of the outer locking sleeve 48. Although only two locking elements 40 and 42 are illustrated, four such elements are normally provided at 90° intervals about the circumference of the valve body 16.

The connector or connection nipple 10 includes an extended forward tube end 54. The tube end 54 is longer than the corresponding end of a standard connector as known to those skilled in the art. The extended end 54 is necessary to permit proper engagement of connector 10 and valve 24 as described below. As illustrated in the drawing, the inner dimensions of the tube end 54 define the minimum passage for fluid flow through the coupler. A circumferential land 56 and a groove 58 are defined by the connector 10 adjacent the tube end 54. As illustrated in FIG. 2, the groove 58 cooperates with locking elements 40 and 42 to maintain the connector 10 in a locked position in the valve and coupler body unit 12.

Referring now to FIG. 2, a brief description of the operation of the first embodiment of the coupler of the invention will be set forth. The connector 10 is first inserted through the outlet bore 18. The tube end 54 of the connector 10 fits through the retainer ring 38, spring 36 and locking flange ring 22 to engage the valve member 24. The forward tube end 54 causes the passage 27 of valve member 24 to open or spread for admission of the tube end 54. This is possible because the valve member 24 is elastically deformable. It should be noted that the valve member 24 seals against the forward tube end 54 because of the elastic nature of the valve member 24. This sealing effect is accentuated by the fact that fluid pressure on the inlet side of the body unit 12 acts against the valve member 24 to maintain it securely against the tube end 54 of the connector 10.

As the connector 10 is inserted into the unit 12, the retainer ring 38 is driven against the spring 36, permitting the locking elements 40 and 42 to drop into the groove 58. Once the locking elements have dropped into the groove 58, the outer locking sleeve 48 is biased toward the outlet sleeve 52 by the spring 50. The connector 10 is then locked into the valve and coupler body unit 12. To remove the connector 10, the outer locking sleeve 48 is manually withdrawn or pushed against the force of the spring 50 and the connector 10 is pulled from the coupler body unit 12.

It is important to note the function of the various inclined surfaces which are utilized in the construction of the coupler. For example, the inclined surface 60 defined on the outer locking sleeve 48 engages locking elements 40 and 42 to drive the locking elements 40 and 42 downwardly into the groove 58 when the connector 10 is inserted into unit 12. Upon withdrawal of the connector 10, inclined surface 62 on retainer ring 38 serves to drive the ball bearings or locking elements 40 and 42 upwardly into openings 44 and 46. Inclined surface 64 of connector 10 assists in this upward driving operation of the locking elements 40 and 42. When the connector 10 is in a locked position, surface 64 and an opposite surface 66 cooperate to hold or engage locking elements 40 and 42 thereby more rigidly securing the connector 10 in position within the coupler.

Also to be noted is the shape of the forward tube end 54 of the connector 10. The leading edge 68 of the forward tube end 54 is rounded so that it will slide against the downstream side of the valve member 24 and thus facilitate the opening of the valve member 24 at passage 27. By using a valve member 24 of the type previously described in combination with the various other elements for the described coupler, the pressure drop for the coupler will be no greater than the pressure drop through the connector 10. This results since the minimum diameter of fluid passage through the coupler is defined by the size of the passage through the connector 10.

FIGS. 3 and 4 illustrate the second preferred embodiment. The construction of the second embodiment is substantially identical to that of the first embodiment in many respects. Therefore, like numbers have been used to indicate like parts of the two embodiments. The description for the first preferred embodiment is adopted for the second embodiment insofar as the identification of parts is the same.

The second embodiment is a coupler which may be utilized with standard connectors of the type now in common use. This is one principal difference from the first embodiment. Such a standard connector is ilustrated in partial cross-section in FIG. 4 and is identified as connector 70. Connector 70 includes a land and groove construction identical to that of the connector 10. However, the connector 70 does not include an extended front end corresponding to tube end 54 in FIGS. 1 and 2. Rather, connector 70 includes a snub-nosed or slightly extended front end 72 with a leading edge 68 substantially the same as the leading edge 68 of connector 10.

The coupler of the second embodiment includes an intermediate tube or combination retaining ring and cylindrical tube 74 in place of the ring 38 of the first embodiment. Tube 74 includes an inclined, circumferential leading edge surface 76 which is cooperative with an inclined surface 78 of land 56 of connector 70. Tube 74 also includes a forwardly extending, cylindrical tube section 80. Section 80 has an internal radius, $R_1$, substantially equal to the internal radius, $R_3$, of connector 70. The tube section 80 extends through the fitting or flange ring 22 to a position just short of a valve member 82 for the second embodiment. Thus, the tube 74 is normally biased to the position shown in FIG. 3 by the spring 36 to force valve elements 40 and 42 outward in openings 44 and 46 respectively.

Tube 74 also includes a cylindrical section or portion 85 with an internal radius, $R_2$, substantially equal to or slightly greater than the external radius $R_4$, of front end 72 of connector 70. Section 85 of tube 74 includes an inner circumferential groove 84 with an O-ring 86. Thus, the front end 72 of the connector 70 will seal against the O-ring 86 in the manner illustrated in FIG. 4 when the connector 70 is inserted into the coupler. Additionally, a fluid flow passage of uniform radius equal to the internal radius, $R_3$, of connector 70 is provided through the coupler.

Simultaneous with the sealing of the front end 72 against the O-ring 86, the tube 74 is pushed forward to open the valve member 82 as illustrated in FIG. 4. The tube 74 includes a rounded leading edge 75 analogous to the leading edge 68 of connector 10. Importantly, the valve member 82 includes a circumferential sealing projection 88 which seals against the tube section 80 as illustrated in both FIGS. 3 and 4 to thereby facilitate the seal through the coupler. Thus, it can be seen that a standard connector of the type most commonly used in the industry can be utilized to cooperate with the coupler of the present invention.

In the description of the second embodiment, reference was made to a specific valve member 82 which differs slightly from valve member 24 in FIGS. 1 and 2. The use of the valve member 82 is not limited to the second embodiment illustrated in FIGS. 3 and 4. That is, the valve member 82 could just as easily have been used in the first embodiment of FIGS. 1 and 2.

As illustrated in FIGS. 3 and 4, the valve member 82 is retained within the valve body 16 by cooperation of the ring 22 and fitting 20 with the valve member 82 and body 16. The construction and function of the projection and function of the projection 88 was discussed above.

FIGS. 5 and 6 further illustrate the particular valve member 82 which was used in the present description of the second embodiment. As illustrated in FIGS. 5 and 6, the valve member 82 has a forward conical projection 90 with three slits that intersect along the center line axis 14. These slits 92–94 extend all the way through the projection 90 so that when the tube 74 is pushed to the position shown in FIG. 4, it will cause the projection 90 to separate along the lines defined by the slits 92–94. Although FIG. 5 illustrates three intersecting slits, this is not a restricted number of slits. Two or more slits may be utilized with this particular valve construction.

What Is claimed Is:

1. An improved cylindrical fluid coupler comprising, in combination: a connector; a valve and coupler body including an inlet, said body also including an outlet for receiving said connector and an interior fluid flow passage; means for locking said connector and said valve and coupler body together whenever said connector is inserted into said body; a separate intermediate fluid flow tube means mounted within said body, said tube means providing at least a portion of said interior fluid flow passage and movable transversely along the axis of fluid flow through said coupler body in response to insertion of said connector in said body; and valve means in said fluid flow passage of said valve and coupler body, said valve means including an elastically deformable valve member fastened about its circumference to the wall of said passage, said valve member having a normally closed, elastic central portion closing the entire passage through said body and projecting toward the inlet side of said valve and coupler body, said central portion having at least one slit therethrough and being elastically deformed and opened by engagement of said tube means against the outlet side of said valve member when said connector is inserted into said coupler body and operatively translates said tube means to position said tube means through said valve member for fluid flow through said interior flow passage, said tube means defining the diameter of said fluid flow passage through said valve member and also providing an unblocked, minimum cross-sectional area for said fluid flow passage.

2. The improved coupler of claim 1 wherein said elastically deformable valve member is substantially symmetrical about a center line axis through said fluid passage.

3. The improved coupler of claim 1 wherein said elastically deformable member has a duck bill cross section with the point of the duck bill directed toward the inlet side of said body.

4. The improved coupler of claim 1 wherein said means for locking include locking elements on said body cooperative with an outer circumferential groove in said connector, said locking elements being driven into said groove whenever said connector is joined to said body.

5. The improved coupler of claim 1 wherein said means for locking includes means for releasing said means for locking said connector to said body.

6. The improved coupler of claim 1 wherein said tube means includes a forward cylindrical tube end having a rounded leading edge portion to spread said valve member as said connector is inserted into said body.

7. The improved coupler of claim 1 wherein said central portion of said valve member is sealed against said tube means whenever said tube means is positioned through said aperture.

8. The improved coupler of claim 1 including sealing means between said tube means and said connector operative whenever said connector is inserted in said coupler.

9. The improved coupler of claim 1 including sealing means between said valve member and said tube means aperture whenever said connector is inserted in said coupler.

10. The improved coupler of claim 1 wherein said tube means and said connector have internal cylindrical passages and wherein the radius of said passage of said tube means is at least equal to the passage radius of said connector.

11. The improved coupler of claim 1 wherein said tube means is extended entirely through said valve member whenever said connector is inserted in said coupler.

12. The improved coupler of claim 1 including biasing means for normally biasing said tube means out of engagement with said valve member.

* * * * *